United States Patent
Yang

(10) Patent No.: US 10,422,963 B2
(45) Date of Patent: Sep. 24, 2019

(54) WATERPROOF OPTICAL FIBER CONNECTOR

(71) Applicant: PROTAI PHOTONIC CO., LTD, New Taipei (TW)

(72) Inventor: Jyh-Cherng Yang, Taipei (TW)

(73) Assignee: PROTAI PHOTONIC CO., LTD, New Taipei (TW)

( * ) Notice: Subject to any disclaimer, the term of this patent is extended or adjusted under 35 U.S.C. 154(b) by 0 days.

(21) Appl. No.: 15/984,742

(22) Filed: May 21, 2018

(65) Prior Publication Data

US 2019/0250339 A1    Aug. 15, 2019

(30) Foreign Application Priority Data

Feb. 14, 2018 (TW) .............................. 107105616 A

(51) Int. Cl.
*G02B 6/38* (2006.01)
(52) U.S. Cl.
CPC ........... *G02B 6/3849* (2013.01); *G02B 6/381* (2013.01)
(58) Field of Classification Search
CPC .............................. G02B 6/381; G02B 6/3849
See application file for complete search history.

(56) References Cited

U.S. PATENT DOCUMENTS

| | | | | |
|---|---|---|---|---|
| 5,134,677 A * | 7/1992 | Leung | .................. | G02B 6/3825 385/62 |
| 7,004,638 B2 * | 2/2006 | Nicholson | ............ | G02B 6/3816 385/53 |
| 8,419,294 B2 * | 4/2013 | Hyakutake | ........... | G02B 6/3821 385/60 |
| 2008/0317415 A1 * | 12/2008 | Hendrickson | ........ | G02B 6/3849 385/77 |
| 2010/0014812 A1 * | 1/2010 | Dobler | ................. | G02B 6/3849 385/70 |

FOREIGN PATENT DOCUMENTS

JP          10311933 A    *   11/1998  ............... G02B 6/38

* cited by examiner

*Primary Examiner* — Daniel Petkovsek
(74) *Attorney, Agent, or Firm* — WPAT, PC

(57) ABSTRACT

An optical fiber connector according to the present disclosure includes a hollow housing, a ferrule holder, a spring, a back post and a sealing ring. The hollow housing has four side walls, wherein two of the four side walls are respectively provided with an opening. An annular bevel is formed in the interior of the housing. The ferrule holder is disposed within the housing. The spring is disposed within the housing to push the ferrule holder. The back post is partially disposed in the housing for abutting on the spring. Two protrusions are formed on the back post and respectively fall in the two openings on the housing. The sealing ring is put on the back post, wherein the back post is configured to push the sealing ring toward the annular bevel inside the housing such that the sealing ring abuts on the annular bevel.

9 Claims, 16 Drawing Sheets

WATERPROOF OPTICAL FIBER CONNECTOR

RELATED APPLICATION

The present application is based on and claims priority to Taiwanese Application Number 107105616, filed Feb. 14, 2018, the disclosure of which is hereby incorporated by reference herein in its entirety.

BACKGROUND

1. Technical Field

The disclosure relates to an optical fiber connector, and more particularly, to a waterproof optical fiber connector.

2. Description of the Related Art

Optical fibers have revolutionized communication throughout the world. With the increased use of optical fibers it has become increasingly important to be able to connect and disconnect optical fiber cables from various sources. Two optical fiber cables can be optically coupled so that they are in communication with each other by using optical fiber connectors and an optical fiber adapter, thereby putting each optical fiber cable in communication with the other. The optical fiber connectors are placed on the end of each cable and then plugged into the optical fiber adapter. The optical fiber adapter has two openings each one designed to receive an optical fiber connector.

However, when an optical fiber connector is inserted into an optical fiber adapter, water may flow through the openings in side walls of the optical fiber connector into the optical fiber connector to rust the spring therein.

Accordingly, there exists a need to provide a solution to solve the aforesaid problems.

SUMMARY

The present disclosure provides an optical fiber connector capable of preventing water from flowing into the interior to rust the spring therein.

In one embodiment, the optical fiber connector of the present disclosure includes a housing, a ferrule holder, a spring, a back post and a sealing ring. The housing has four side walls, wherein each of two of the four side walls is provided with an opening. An annular bevel is formed in the interior of the housing. The ferrule holder is disposed in the housing. The spring is disposed in the housing to push the ferrule holder. The back post is partially disposed in the housing for abutting on the spring. The back post includes two protrusions formed thereon, wherein the two protrusions respectively fall in the two openings on the housing. The sealing ring is put on the back post, wherein the back post is configured to push the sealing ring toward the annular bevel such that the sealing ring abuts on the annular bevel.

In another embodiment, the optical fiber connector of the present disclosure includes a housing, a ferrule holder, a spring, a back post and a sealing ring. The housing has four side walls, wherein each of two of the four side walls is provided with an opening. An annular abrupt surface is formed in the interior of the housing. The ferrule holder is disposed in the housing. The spring is disposed in the housing to push the ferrule holder. The back post is partially disposed in the housing. The back post includes two protrusions formed thereon, wherein the two protrusions respectively fall in the two openings on the housing. An annular front end surface is formed on a front end of the back post. The sealing ring is disposed in the housing, wherein the back post is configured to push the sealing ring toward the abrupt surface such that the sealing ring is sandwiched between the front end surface of the back post and the abrupt surface.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
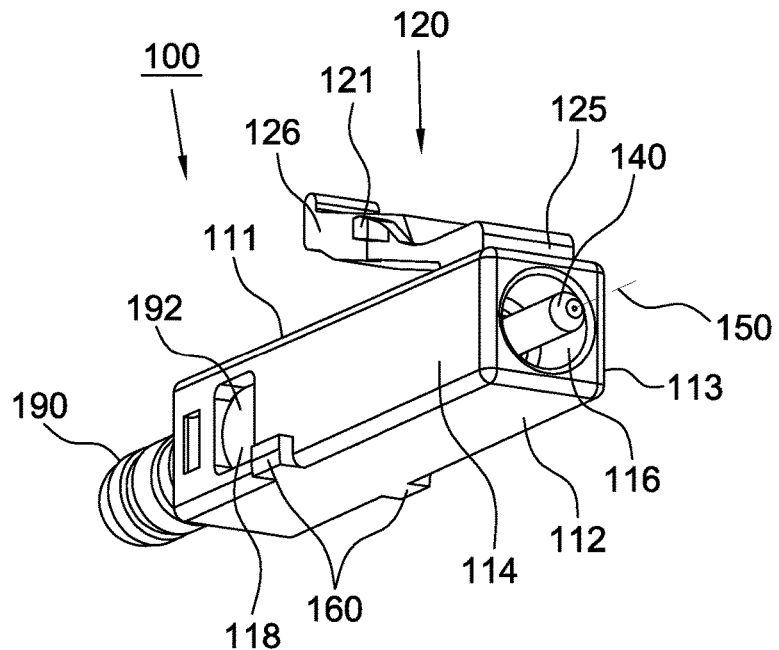
FIG. 1 is an elevated perspective view of the optical fiber connector according to the first embodiment of the present disclosure.
Figure 2:
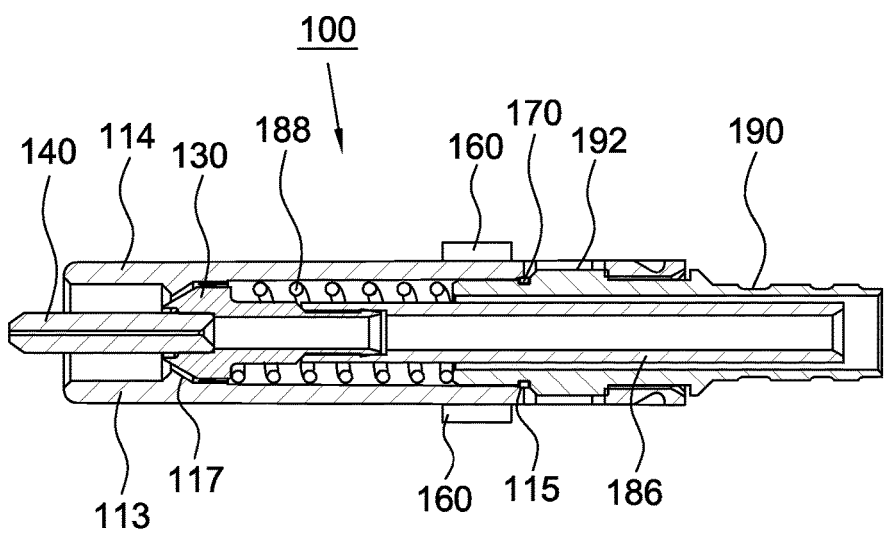
FIG. 2 is a cross-sectional view of the optical fiber connector according to the first embodiment of the present disclosure.

Reference is made to FIGS. 1 to 5, the optical fiber connector 100 according to the first embodiment of the present disclosure may be an LC type optical fiber connector and includes a housing 110 constructed of plastics by an injection molding process. The housing 110 is hollow and substantially has a rectangular shape in cross section. The housing 110 has four side walls comprising a top wall 111, a bottom wall 112, a right wall 113 and a left wall 114, wherein the right wall 113 faces the left wall 114 and connects the top wall 111 and bottom wall 112. A latch 120 is molded into the top wall 111 and includes a living hinge 125 which allows the tab 126 to be moved up and down in a direction perpendicular to the central axis 150-150 of the optical fiber connector 100. The latch 120 further has a pair of protrusions 121 disposed on opposing sides of the tab 126. In addition, a ferrule 140 protrudes from a circular opening 116 on the front end of the housing 110. A coil spring 188 is located within the housing 110 to allow the ferrule 140 to move back and forth through the opening 116. A pair of protrusions 160 is positioned on the right wall 113 and left wall 114 respectively. A rectangular opening 118 is formed on each of the right wall 113 and left wall 114 near the rear end of the housing 110.

In addition, the optical fiber connector 100 further includes a ferrule holder 130, a tube 186, a sealing ring 170 and a back post 190, wherein the ferrule holder 130 is located inside the housing 110. The ferrule 140 is mounted on the ferrule holder 130 such that the rear end thereof is inserted into the opening on the front end of the ferrule holder 130. The front end of the tube 186 is inserted into the rear end of the coil spring 188. The rear end of the ferrule holder 130 is inserted into the front end of the coil spring 188, and is also inserted and fixed in the opening on the front end of the tube 186. The front portion of the back post 190 is disposed within the housing 110 and the rear portion thereof extends out from the opening on the rear end of the housing 110. The rear end of the tube 186 is inserted into the opening on the front end of the back post 190. Therefore, the ferrule 140, the ferrule holder 130 and the tube 186 have no relative movement with respect to each other, and the tube 186 is movable within the back post 190. The coil spring 188 may push the ferrule holder 130 forward so that the ferrule holder 130 at its front portion is brought into contact with an annular inclined surface 117 on the inner walls of the housing 110 and the front end of the ferrule 140 is pushed past the annular inclined surface 117 and out of the opening 116 on the front end of the housing 110. The sealing ring 170 is resilient and is put on the outer surface of the back post 190. The sealing ring 170 is also sandwiched between the housing 110 and the back post 190.

Figure 3:
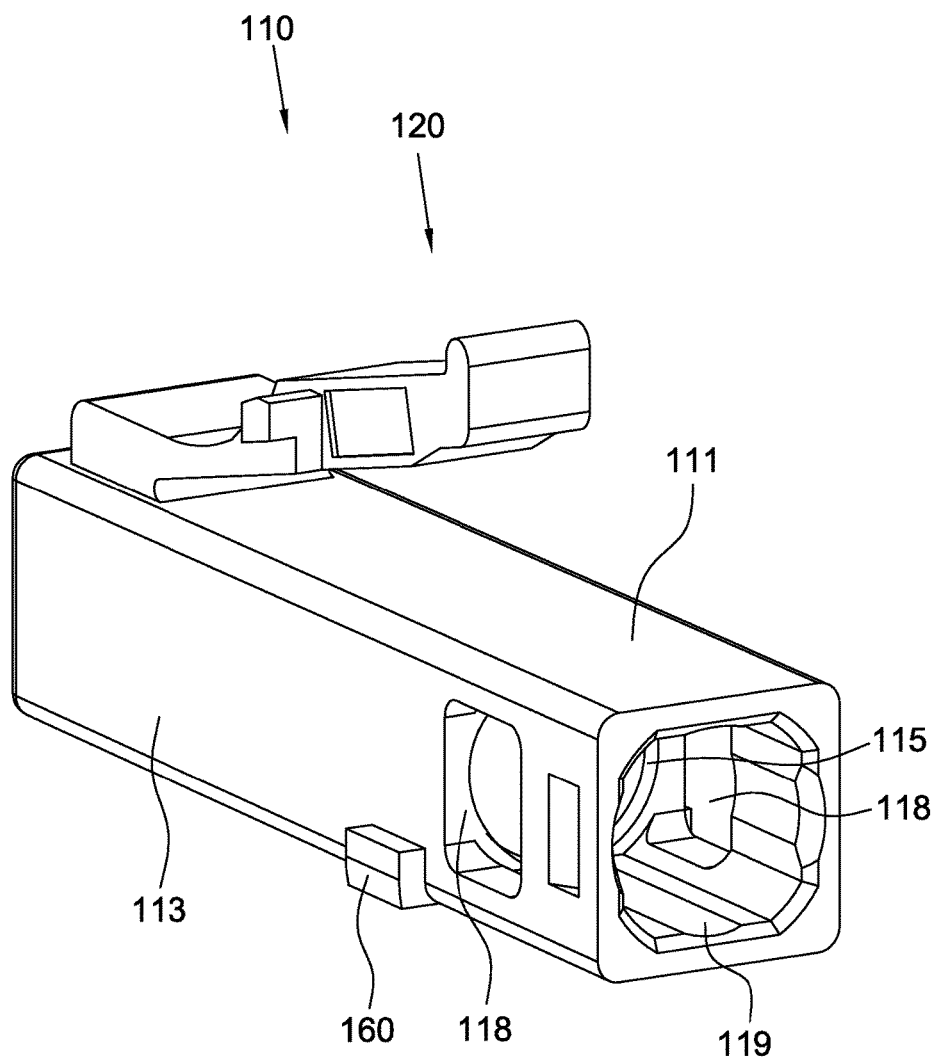
FIG. 3 is an elevated perspective view of the housing of the optical fiber connector according to the first embodiment of the present disclosure.
Figure 4:
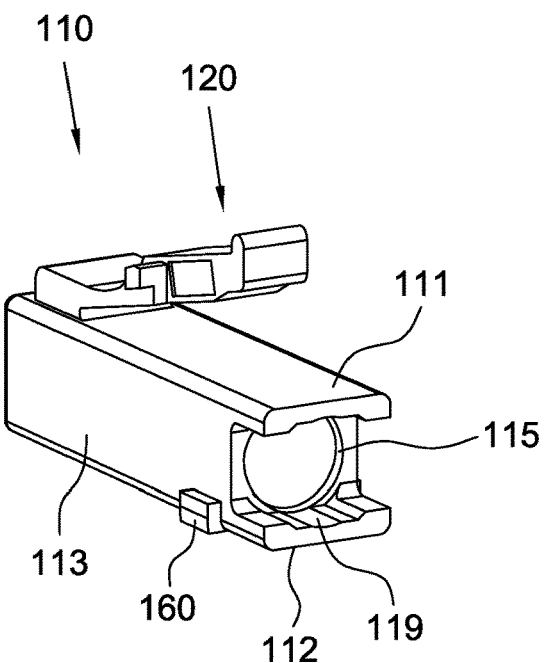
FIG. 4 is a cross-sectional view of the housing of the optical fiber connector according to the first embodiment of the present disclosure.
Figure 5:
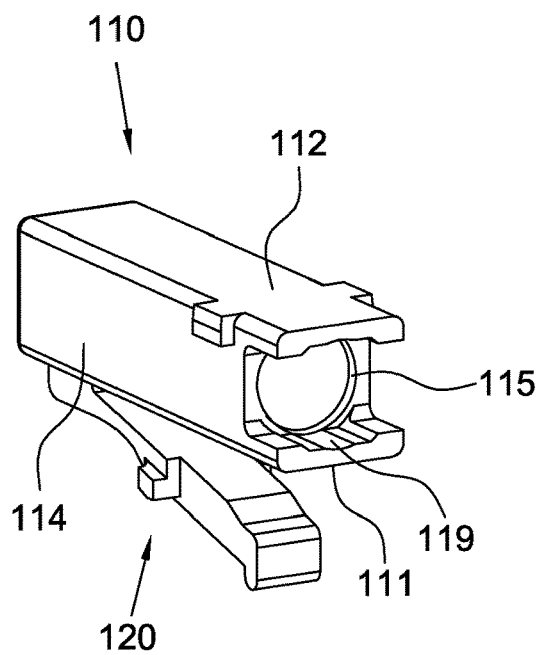
FIG. 5 is another cross-sectional view of the housing of the optical fiber connector according to the first embodiment of the present disclosure.

Reference is made to FIGS. 3, 4 and 5, the housing 110 is hollow and has an inner diameter gradually increased near the openings 118. Therefore, an inclined surface is formed on each of the inner sides of the top wall 111, the bottom wall 112, the right wall 113 and the left wall 114. These inclined surfaces connects together to form an annular bevel 115 on the inner walls of the housing 110. The annular bevel 115 faces the opening on the rear end of the housing 110. In addition, a recess 119 is formed on each of the inner sides of the top wall 111 and the bottom wall 112. The recesses 119 extend longitudinally and connect to the annular bevel 115.

Figure 6:
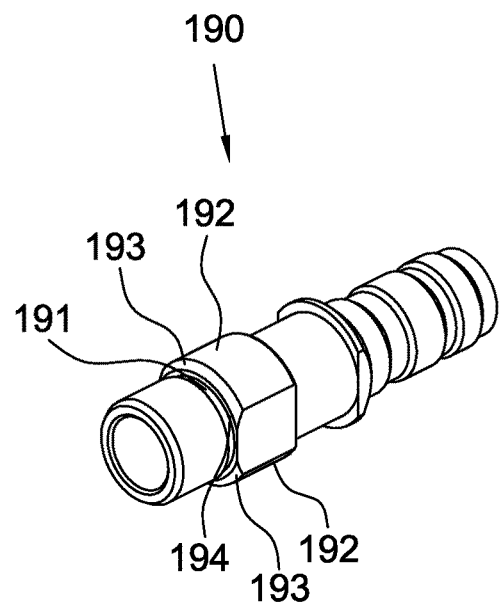
FIG. 6 is an elevated perspective view of the back post of the optical fiber connector according to the first embodiment of the present disclosure.
Figure 7:
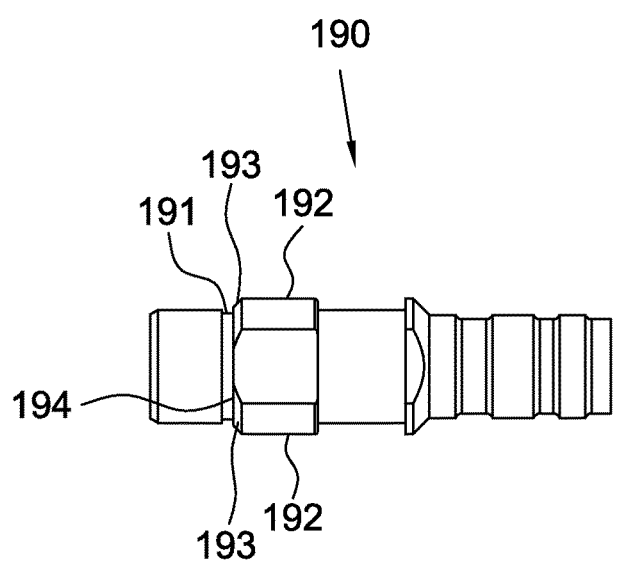
FIG. 7 is a side view of the back post of the optical fiber connector according to the first embodiment of the present disclosure.

Reference is made to FIGS. 6 and 7, the back post 190 is hollow and cylindrical and has a uniform inner diameter. An annular groove 191 is formed on the outer surface of the back post 190. The annular groove 191 is located near the front end of the back post 190. Two arc-shaped protrusions 192 are formed on the outer surface of the back post 190. The protrusions 192 are unconnected and located immediately after the annular groove 191. The protrusions 192 are respectively exposed from the openings 118 on the right wall 113 and the left wall 114 of the housing 110 and fall into the openings 118 respectively when the back post 190 is inserted into the housing 110 (see FIGS. 1 and 2).

The protrusion 192 has a thickness that is substantially uniform everywhere but becomes gradually reduced at the proximity of the groove 191 and abruptly changes to zero at the periphery of the groove 191. Therefore, each of the protrusions 192 has an arcuate and inclined surface 193 adjacent to the groove 191 and an abrupt surface 194 located between the surface 193 and the groove 191, wherein the abrupt surface 194 is perpendicular to the bottom of the groove 191.

Figure 8:
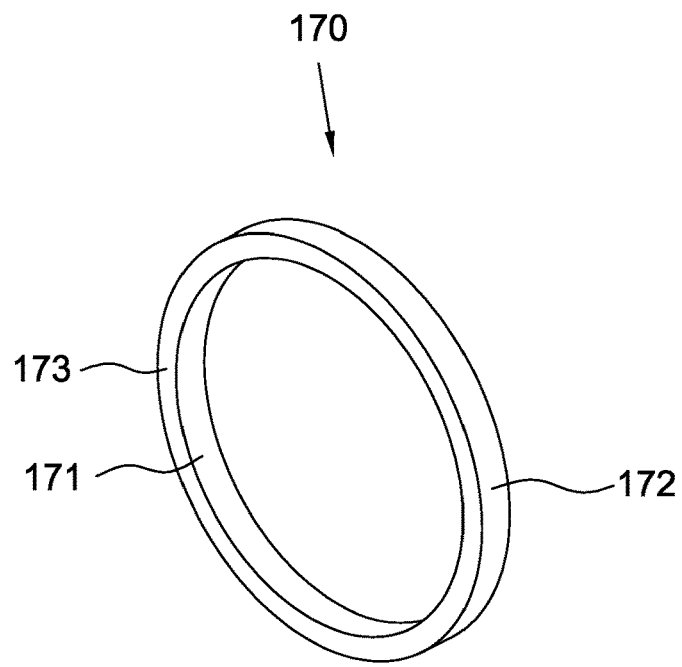
FIG. 8 is an elevated perspective view of the sealing ring of the optical fiber connector according to the first embodiment of the present disclosure.
Figure 9:
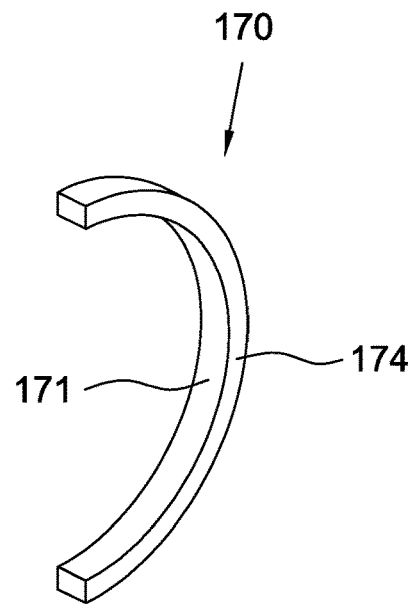
FIG. 9 is a cross-sectional view of the sealing ring of the optical fiber connector according to the first embodiment of the present disclosure.

Reference is made to FIGS. 8 and 9, the resilient sealing ring 170 is annular and has a rectangular cross-section. The sealing ring 170 has an inner surface 171, an outer surface 172 and two side surfaces 173, 174 connecting the inner surface 171 and the outer surface 172, wherein the two side surfaces 173, 174 are planar and parallel to each other.

Figure 10:
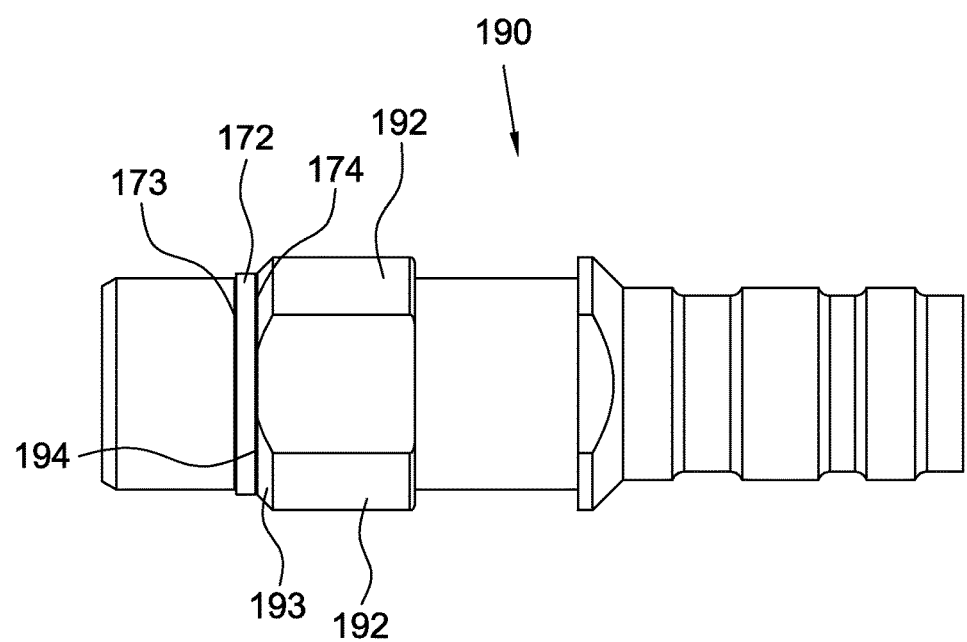
FIG. 10 is a side view illustrating that the sealing ring is put on the back post of the optical fiber connector according to the first embodiment of the present disclosure.

Reference is made to FIG. 10, when the sealing ring 170 is put on the back post 190, the sealing ring 170 is fitted in the groove 191. At this state the inner surface 171 is in close contact with the bottom of the groove 191 and the side surface 174 is in close contact with the abrupt surfaces 194 of the two protrusions 192.

According to the optical fiber connector 100 of the first embodiment of the present disclosure, the assembly of the ferrule 140, the ferrule holder 130 and the tube 186 may be inserted into the housing 110 through the opening on the rear end of the housing 110. Subsequently, the spring 188 is inserted into the housing 110. The assembly of the back post 190 and the sealing ring 170 is finally inserted into the housing 110. The recesses 119 on the inner walls of the housing 110 are configured for the protrusions 192 on the back post 190 to respectively slide thereon so that the protrusions 192 will finally fall in the openings 118 on the right wall 113 and the left wall 114 of the housing 110 respectively (see FIGS. 1 and 2). When the protrusions 192 are respectively trapped in the openings 118, the front end of the back post 190 abuts against the rear end of the spring 188 and the spring 188 is thus compressed to push the ferrule holder 130 forward. In addition, the sealing ring 170 is pushed toward the annular bevel 115 so that the side surface 173 thereof is brought into close contact with the annular bevel 115.

When the optical fiber connector 100 according to the first embodiment of the present disclosure is fully inserted into an optical fiber adapter, the water flowing in the housing 110 through the openings 118 is blocked by the sealing ring 170 and therefore is unable to contact the spring 188 to rust it.

Figure 11:
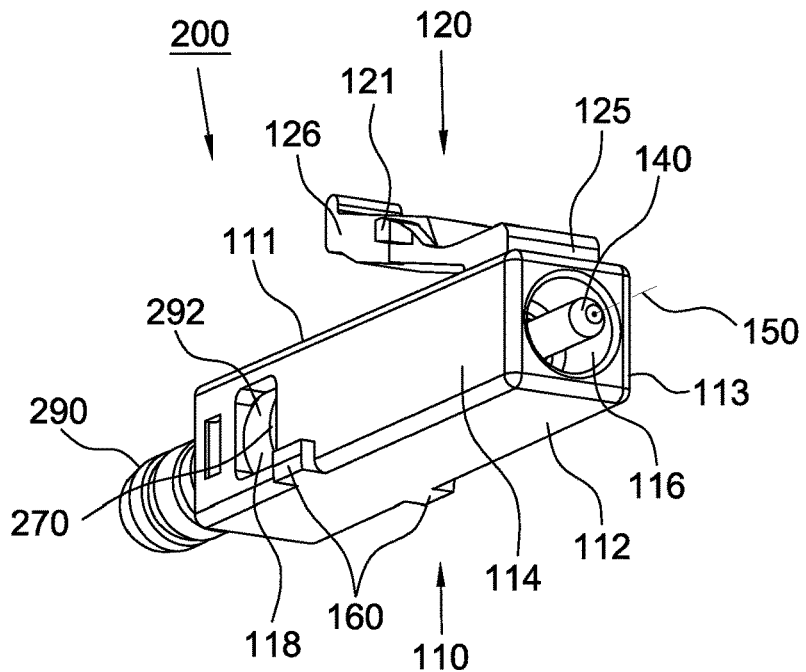
FIG. 11 is an elevated perspective view of the optical fiber connector according to the second embodiment of the present disclosure.
Figure 12:
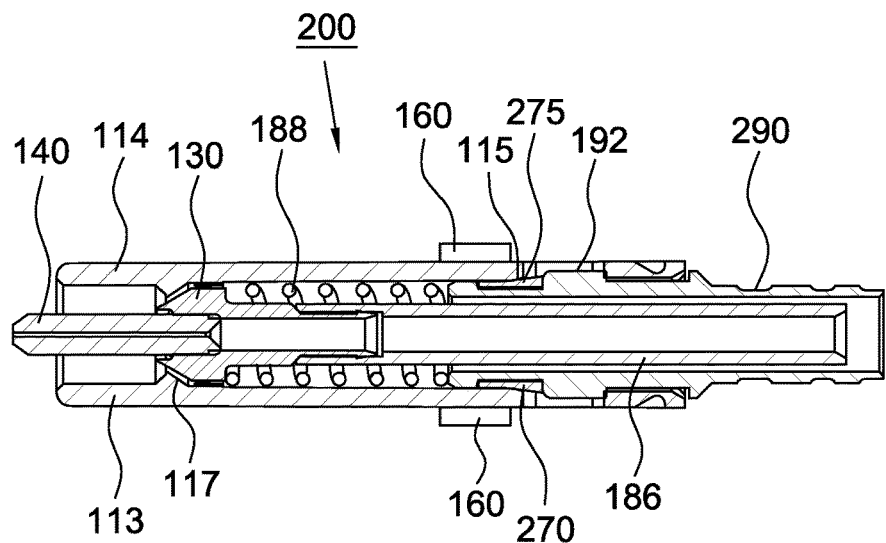
FIG. 12 is a cross-sectional view of the optical fiber connector according to the second embodiment of the present disclosure.

Reference is made to FIGS. 11 and 12, the optical fiber connector 200 according to the second embodiment of the present disclosure includes the housing 110, the coil spring 188, the ferrule holder 130, the ferrule 140 and the tube 186 in the optical fiber connector 100 of the first embodiment. The optical fiber connector 200 further includes a sealing ring 270 and a back post 290 which are respectively different from the sealing ring 170 and the back post 190 in the optical fiber connector 100.

Figure 13:
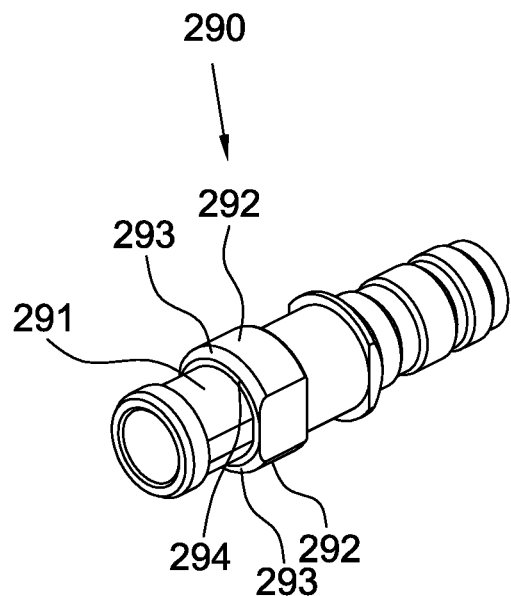
FIG. 13 is an elevated perspective view of the back post of the optical fiber connector according to the second embodiment of the present disclosure.
Figure 14:
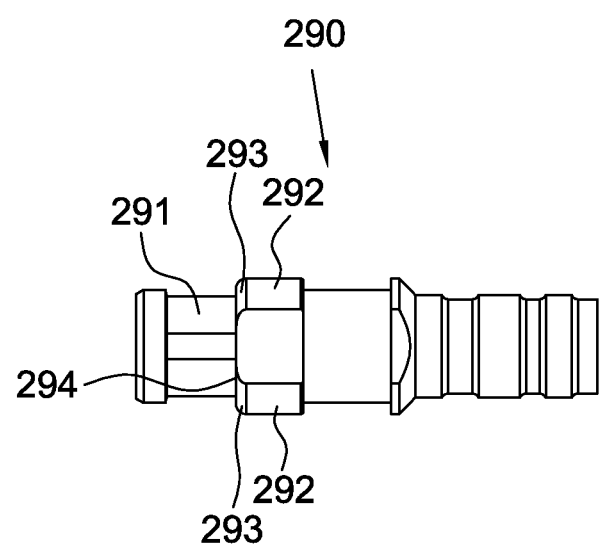
FIG. 14 is a side view of the back post of the optical fiber connector according to the second embodiment of the present disclosure.

Reference is made to FIGS. 13 and 14, the back post 290 is hollow and cylindrical and has a uniform inner diameter. An annular groove 291 is formed on the outer surface of the back post 290. The annular groove 291 is located near the front end of the back post 290. Two arc-shaped protrusions 292 are formed on the outer surface of the back post 290. The protrusions 292 are unconnected and located immediately after the annular groove 291. The protrusions 292 are respectively exposed from the openings 118 on the right wall 113 and the left wall 114 of the housing 110 and fall into the openings 118 respectively when the back post 290 is inserted into the housing 110 (see FIGS. 11 and 12).

The protrusion 292 has a thickness that is substantially uniform everywhere but becomes gradually reduced at the proximity of the groove 291 and abruptly changes to zero at the periphery of the groove 291. Therefore, each of the protrusions 292 has an arcuate and inclined surface 293 adjacent to the groove 291 and an abrupt surface 294 located between the surface 293 and the groove 291, wherein the abrupt surface 294 is perpendicular to the bottom of the groove 291.

Figure 15:
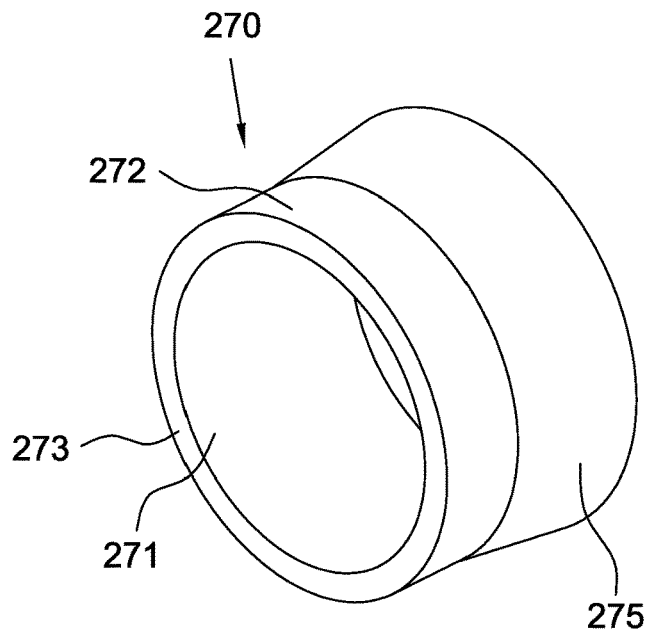
FIG. 15 is an elevated perspective view of the sealing ring of the optical fiber connector according to the second embodiment of the present disclosure.
Figure 16:
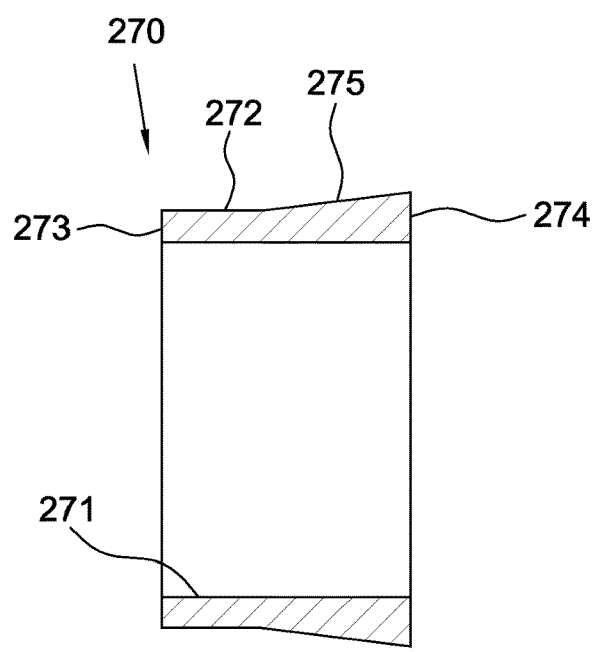
FIG. 16 is a cross-sectional view of the sealing ring of the optical fiber connector according to the second embodiment of the present disclosure.

Reference is made to FIGS. 15 and 16, the resilient sealing ring 170 is annular and has a uniform inner diameter. The sealing ring 270 includes two sections connected one behind the other, wherein the front section has a uniform outer diameter and the rear section has an outer diameter that is gradually increased toward the rear end of the sealing ring 270. Therefore, the sealing ring 270 has an inner surface 271, a front outer surface 272, a rear outer surface 275 and two side surfaces 273, 274, wherein the front outer surface 272 connects the rear outer surface 275, the side surface 273 connects the inner surface 271 with the front outer surface 272, and the side surface 274 connects the inner surface 271 and the rear outer surface 275.

Figure 17:
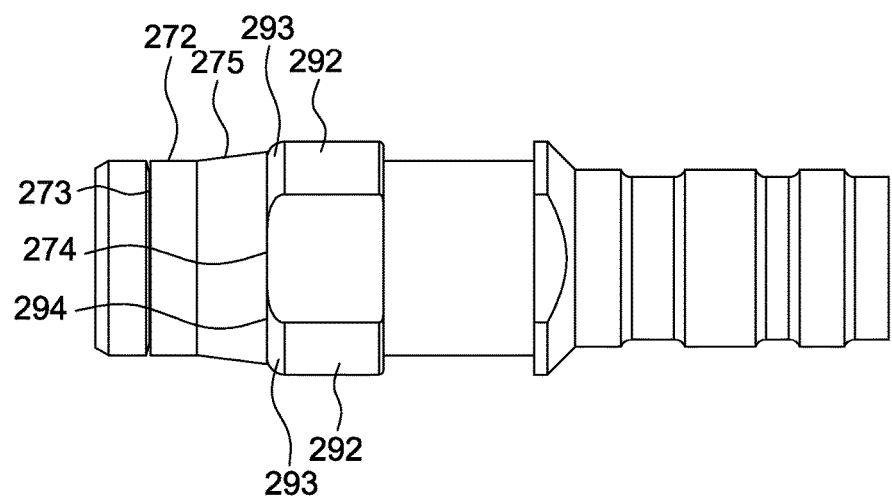
FIG. 17 is a side view illustrating that the sealing ring is put on the back post of the optical fiber connector according to the second embodiment of the present disclosure.
Figure 18:
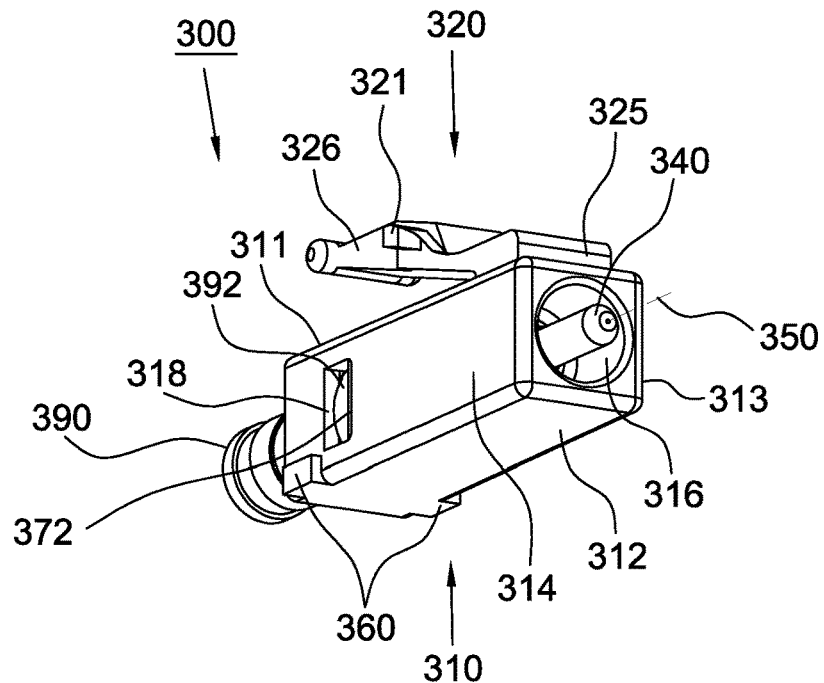
FIG. 18 is an elevated perspective view of the optical fiber connector according to the third embodiment of the present disclosure.
Figure 19:
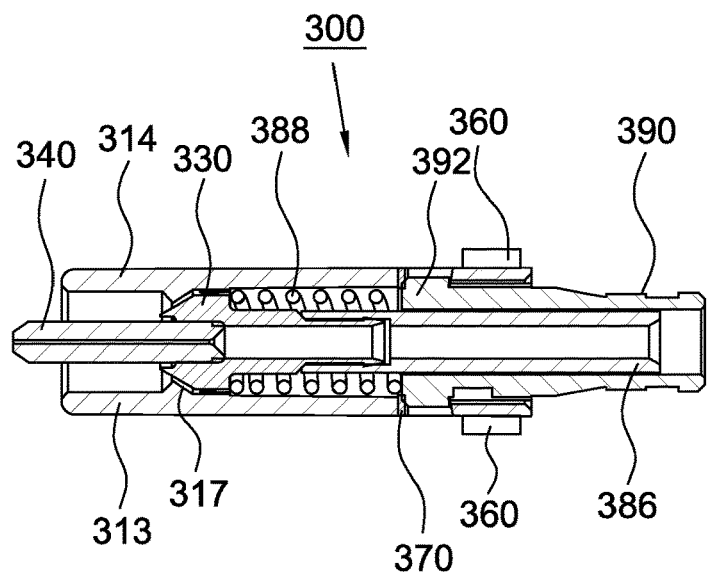
FIG. 19 is a cross-sectional view of the optical fiber connector according to the third embodiment of the present disclosure.

Reference is made to FIG. 17, when the sealing ring 270 is put on the back post 290, the sealing ring 270 is fitted in the groove 291. At this state the inner surface 271 is in close contact with the bottom of the groove 291 and the side surface 274 is in close contact with the abrupt surfaces 294 of the two protrusions 292.

According to the optical fiber connector 200 of the second embodiment of the present disclosure, the assembly of the ferrule 140, the ferrule holder 130 and the tube 186 may be inserted into the housing 110 through the opening on the rear end of the housing 110. Subsequently, the spring 188 is inserted into the housing 110. The assembly of the back post 290 and the sealing ring 270 is finally inserted into the housing 110. The recesses 119 on the inner walls of the housing 110 are configured for the protrusions 292 on the back post 290 to respectively slide thereon so that the protrusions 292 will finally fall in the openings 118 on the right wall 113 and the left wall 114 of the housing 110 respectively (see FIGS. 11 and 12). When the protrusions 292 are respectively trapped in the openings 118, the front end of the back post 290 abuts against the rear end of the spring 188 and the spring 188 is thus compressed to push the ferrule holder 130 forward. Portions of the rear outer surface 275 of the sealing ring 270 are respectively exposed from the openings 118. In addition, the sealing ring 270 is pushed toward the annular bevel 115 so that the inclined rear outer surface 275 thereof is brought into close contact with the annular bevel 115.

When the optical fiber connector 200 according to the second embodiment of the present disclosure is fully inserted into an optical fiber adapter, the water flowing in the housing 110 through the openings 118 is blocked by the sealing ring 270 and therefore is unable to contact the spring 188 to rust it.

Reference is made to FIGS. 18 to 22, the optical fiber connector 300 according to the third embodiment of the present disclosure may be an LC type optical fiber connector and includes a housing 310 constructed of plastics by an injection molding process. The housing 310 is hollow and substantially has a rectangular shape in cross section. The housing 310 has four side walls comprising a top wall 311, a bottom wall 312, a right wall 313 and a left wall 314, wherein the right wall 313 faces the left wall 314 and connects the top wall 311 and bottom wall 312. A latch 320 is molded into the top wall 311 and includes a living hinge 325 which allows the tab 326 to be moved up and down in a direction perpendicular to the central axis 350-350 of the optical fiber connector 300. The latch 320 further has a pair of protrusions 321 disposed on opposing sides of the tab 326. In addition, a ferrule 340 protrudes from a circular opening 316 on the front end of the housing 310. A coil spring 388 is located within the housing 310 to allow the ferrule 340 to move back and forth through the opening 316. A pair of protrusions 360 is positioned on the right wall 313 and left wall 314 respectively. A rectangular opening 318 is formed on each of the right wall 313 and left wall 314 near the rear end of the housing 310.

In addition, the optical fiber connector 300 further includes a ferrule holder 330, a tube 386, a sealing ring 370 and a back post 390, wherein the ferrule holder 330 is located inside the housing 310. The ferrule 340 is mounted on the ferrule holder 330 such that the rear end thereof is inserted into the opening on the front end of the ferrule holder 330. The front end of the tube 386 is inserted into the rear end of the coil spring 388. The rear end of the ferrule holder 330 is inserted into the front end of the coil spring 388, and is also inserted and fixed in the opening on the front end of the tube 386. The front portion of the back post 390 is disposed within the housing 310 and the rear portion thereof extends out from the opening on the rear end of the housing 310. The rear end of the tube 386 is inserted into the opening on the front end of the back post 390. Therefore, the ferrule 340, the ferrule holder 330 and the tube 386 have no relative movement with respect to each other, and the tube 386 is movable within the back post 390. The coil spring 388 may push the ferrule holder 330 forward so that the ferrule holder 330 at its front portion is brought into contact with an annular inclined surface 317 on the inner walls of the housing 310 and the front end of the ferrule 340 is pushed past the annular inclined surface 317 and out of the opening 316 on the front end of the housing 310. The sealing ring 370 is resilient and able to abut against the front end face of the back post 390.

Figure 20:
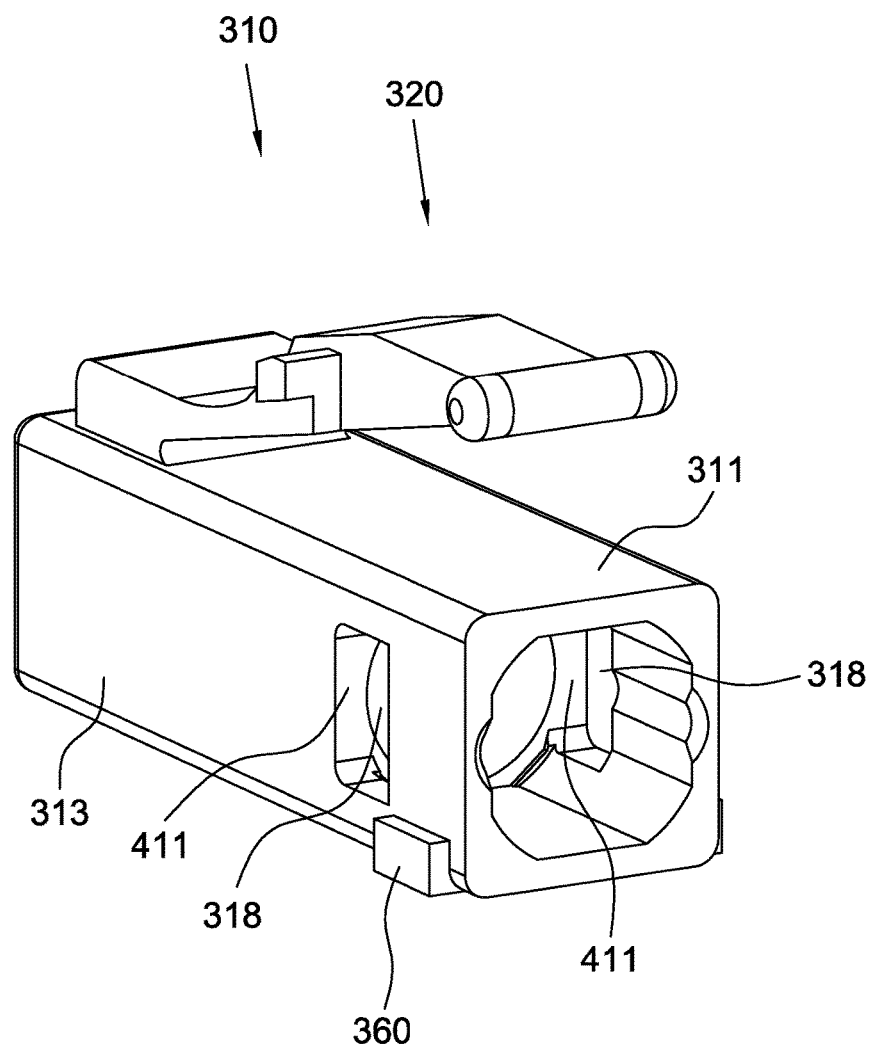
FIG. 20 is an elevated perspective view of the housing of the optical fiber connector according to the third embodiment of the present disclosure.
Figure 21:
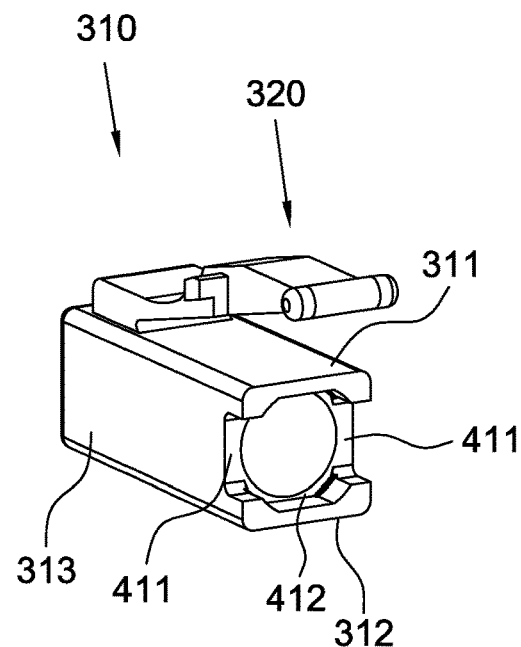
FIG. 21 is a cross-sectional view of the housing of the optical fiber connector according to the third embodiment of the present disclosure.
Figure 22:
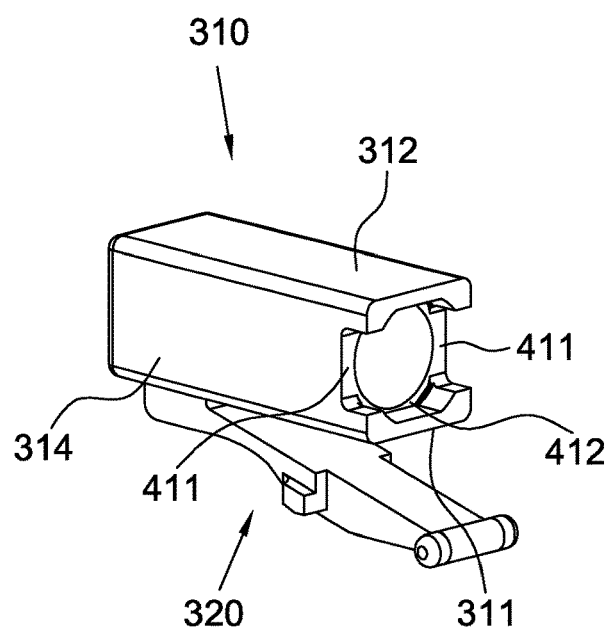
FIG. 22 is another cross-sectional view of the housing of the optical fiber connector according to the third embodiment of the present disclosure.

Reference is made to FIGS. 20, 21 and 22, the housing 310 is hollow and a rectangular opening 318 is formed on each of the right wall 313 and left wall 314 near the rear end of the housing 310. Therefore, each of the rectangular openings 318 is defined by four flat inner walls, and one of the inner walls is named as the inner wall 411 which faces the rear end of the housing 310. In addition, the thickness of the top wall 311 and the bottom wall 312 abruptly decreases near the openings 318 such that each of the top wall 311 and the bottom wall 312 is formed with an abrupt surface 412 which is planar and faces the rear end of the housing 310. The abrupt surfaces 412 are perpendicular to the top wall 311 and the bottom 312. In one embodiment, the two inner walls 411 may also be defined as abrupt surfaces 411 in the right wall 313 and the left wall 314 respectively. The two abrupt surfaces 411 are planar and perpendicular to the right wall 313 and the left wall 314 respectively, and are coplanar with the abrupt surfaces 412. The abrupt surfaces 412 connect the abrupt surfaces 411 to form a continuous ring of abrupt surface.

Figure 23:
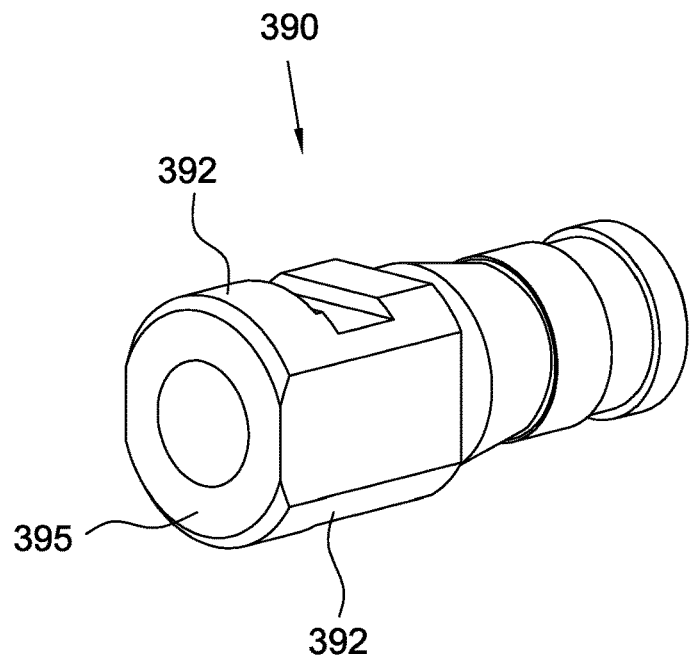
FIG. 23 is an elevated perspective view of the back post of the optical fiber connector according to the third embodiment of the present disclosure.
Figure 24:
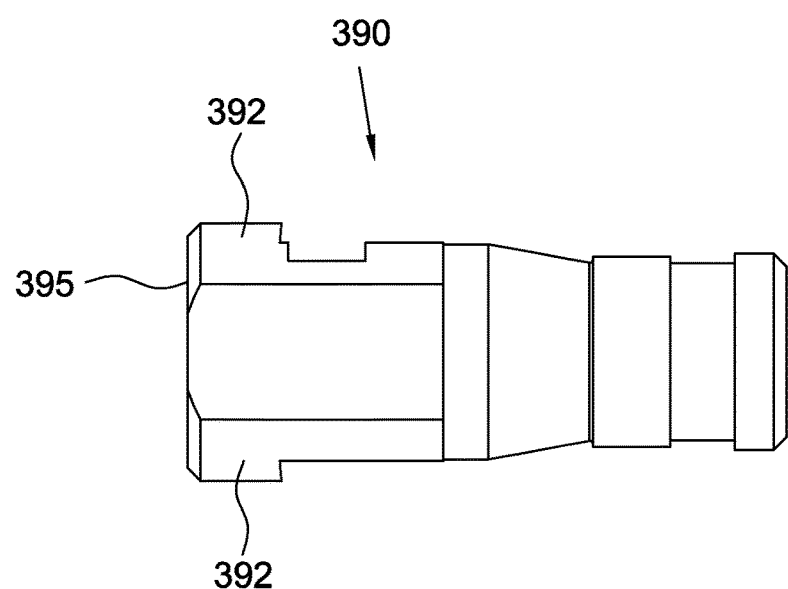
FIG. 24 is a side view of the back post of the optical fiber connector according to the third embodiment of the present disclosure.

Reference is made to FIGS. 23 and 24, the back post 390 is hollow and cylindrical and has a uniform inner diameter. A front end surface 395 is formed on the front end of the back post 390. The front end surface 395 is annular and planar. Two arc-shaped protrusions 392 are formed on the outer surface of the back post 390. The protrusions 392 are unconnected and located near the front end surface 395. The protrusions 392 are respectively exposed from the openings 318 on the right wall 313 and the left wall 314 of the housing 310 and fall into the openings 318 respectively when the back post 390 is inserted into the housing 310 (see FIGS. 18 and 19).

Figure 25:
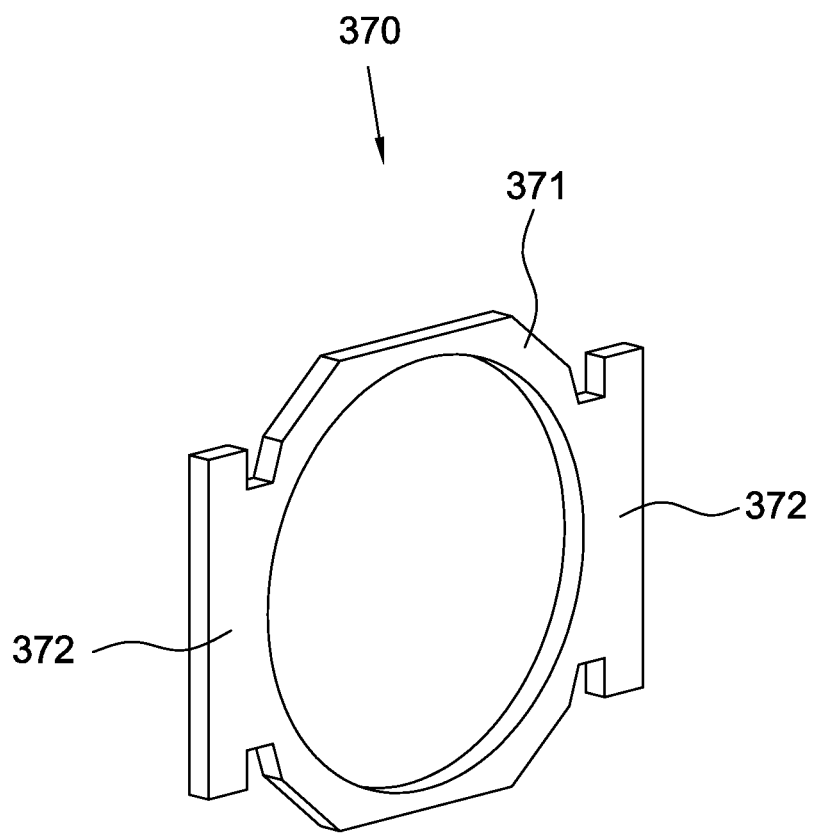
FIG. 25 is an elevated perspective view of the sealing ring of the optical fiber connector according to the third embodiment of the present disclosure.

Reference is made to FIG. 25, the resilient sealing ring 370 is flat and has a ring shape. The sealing ring 370 includes a body 371 which is annular and has a uniform inner diameter. In addition, a wing 372 extends from each of the right and left sides of the body 371. The wing 372 is flat and has a rectangular shape.

Figure 26:
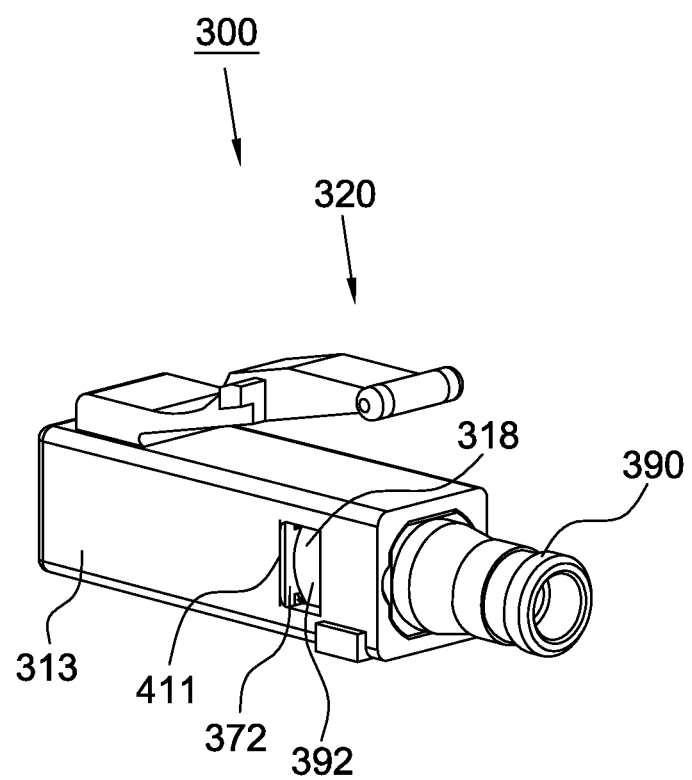
FIG. 26 is another elevated perspective view of the optical fiber connector according to the third embodiment of the present disclosure.

According to the optical fiber connector 300 of the third embodiment of the present disclosure, the assembly of the ferrule 340, the ferrule holder 330 and the tube 386 may be inserted into the housing 310 through the opening on the rear end of the housing 310. Subsequently, the spring 388 is inserted into the housing 310. The sealing ring 370 is then placed in the housing 310 with its wings 372 attached to the two abrupt surfaces 411 of the housing 310 respectively. Finally, the back post 390 is inserted into the housing 310 such that the protrusions 392 fall in the openings 318 on the right wall 313 and the left wall 314 of the housing 310 respectively (see FIGS. 18 and 19). When the protrusions 392 are respectively trapped in the openings 318, the front end surface 395 of the back post 390 abuts against the body 371 of the sealing ring 370 and the body 371 abuts against the rear end of the spring 388. The spring 388 is compressed to push the ferrule holder 330 forward accordingly. In addition, the sealing ring 370 is also pushed toward the abrupt surfaces 411, 412 of the housing 310 so that the inner edges of the body 371 of the sealing ring 370 are brought into close contact with the abrupt surfaces 411, 412 (See FIG. 26).

When the optical fiber connector 300 according to the third embodiment of the present disclosure is fully inserted into an optical fiber adapter, there is no gap existing between the sealing ring 370 and the abrupt surfaces 411, 412 of the housing 310 for the water to pass through since the sealing ring 370 is closely sandwiched between the front end surface 395 of the back post 390 and the abrupt surfaces 411, 412. Accordingly, the water flowing in the housing 310 through the openings 318 is blocked by the sealing ring 370 and unable to contact the spring 388 to rust it.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber connector, comprising:
   a housing having four side walls defined as top, bottom, right and left walls respectively, wherein each of the right and left walls is provided with an opening, and an annular bevel is formed in the interior of the housing;
   a ferrule holder disposed in the housing;
   a spring disposed in the housing to push the ferrule holder;
   a back post partially disposed in the housing for abutting on the spring, the back post comprising two protrusions formed thereon, the two protrusions respectively falling in the two openings on the housing; and
   a sealing ring put on the back post, wherein the back post is configured to push the sealing ring toward the annular bevel such that the sealing ring abuts on the annular bevel.

2. The optical fiber connector as claimed in claim 1, wherein an annular groove is formed on the back post to receive the sealing ring.

3. The optical fiber connector as claimed in claim 2, wherein each of the protrusions has a surface in contact with the sealing ring, the protrusions are configured to push the sealing ring toward the annular bevel.

4. The optical fiber connector as claimed in claim 1, wherein the sealing ring comprises:
   a front section having a uniform outer diameter, wherein the front section further has a front outer surface in contact with the interior of the housing; and
   a rear section connected to the front section, the rear section having an outer diameter that is gradually increased toward a rear end of the sealing ring, wherein the rear section further has an inclined rear outer surface abutting on the annular bevel of the housing.

5. The optical fiber connector as claimed in claim 4, wherein portions of the inclined rear outer surface of the sealing ring are respectively exposed from the openings of the housing.

6. The optical fiber connector as claimed in claim 1, wherein the sealing ring has a rectangular cross section.

7. An optical fiber connector, comprising:
   a housing having four side walls defined as top, bottom, right and left walls respectively, wherein each of the right and left walls is provided with an opening, and an annular abrupt surface is formed in the interior of the housing;
   a ferrule holder disposed in the housing;
   a spring disposed in the housing to push the ferrule holder;

a back post partially disposed in the housing, the back post comprising two protrusions formed thereon, the two protrusions respectively falling in the two openings on the housing, wherein an annular front end surface is formed on a front end of the back post; and a sealing ring disposed in the housing, wherein the back post is configured to push the sealing ring toward the annular abrupt surface such that the sealing ring is sandwiched between the annular front end surface of the back post and the annular abrupt surface.

8. The optical fiber connector as claimed in claim 7, wherein the sealing ring comprises:

a body abutting on the annular abrupt surface; and two wings extending from two opposing sides of the body into the openings of the housing respectively.

9. The optical fiber connector as claimed in claim 8, wherein the wings are of rectangular shape.

\* \* \* \* \*